(12) United States Patent
Andrack et al.

(10) Patent No.: US 10,607,508 B2
(45) Date of Patent: Mar. 31, 2020

(54) MODULAR SURGICAL TRAINING SYSTEM

(71) Applicant: FORSCHUNGS- UND TRANSFERZENTRUM LEIPZIG E.V. AN DER HOCHSCHULE FÜR TECHNIK, WIRTSCHAFT UND KULTUR, Leipzig (DE)

(72) Inventors: Ben Andrack, Leipzig (DE); Matthias Mueller, Polenz (DE); Jochen Handwerk, Holzkirchen (DE); Ingo Lorber, Leipzig (DE); Christian Koehler, Leipzig (DE); Werner Korb, Leipzig (DE); Luis Enrique Bernal Vera, Leipzig (DE); Tobias Pilic, Leipzig (DE)

(73) Assignee: FORSCHUNGS- UND TRANSFERZENTRUM LEIPZIG E.V. AN DER HOCHSCHULE FÜR TECHNIK, WIRTSCHAFT UND KULTUR LEIPZIG, Leipzig (DE)

( * ) Notice: Subject to any disclaimer, the term of this patent is extended or adjusted under 35 U.S.C. 154(b) by 668 days.

(21) Appl. No.: 15/037,753

(22) PCT Filed: Nov. 18, 2014

(86) PCT No.: PCT/EP2014/074934
§ 371 (c)(1),
(2) Date: May 19, 2016

(87) PCT Pub. No.: WO2015/075038
PCT Pub. Date: May 28, 2015

(65) Prior Publication Data
US 2016/0275820 A1 Sep. 22, 2016

(30) Foreign Application Priority Data
Nov. 19, 2013 (DE) .......................... 10 2013 112 745
Nov. 19, 2013 (DE) .......................... 10 2013 112 746

(51) Int. Cl.
*G09B 23/30* (2006.01)
*G09B 23/28* (2006.01)
*G09B 23/34* (2006.01)

(52) U.S. Cl.
CPC ........... *G09B 23/303* (2013.01); *G09B 23/28* (2013.01); *G09B 23/286* (2013.01); *G09B 23/34* (2013.01)

(58) Field of Classification Search
CPC ...... G09B 23/303; G09B 23/30; G09B 23/32; G09B 23/28; G09B 23/286; G09B 23/34
(Continued)

(56) References Cited

U.S. PATENT DOCUMENTS 2,871,579 A * 2/1959 Niranen ................. G09B 23/28
417/326
3,640,277 A 2/1972 Adelberg
(Continued)

FOREIGN PATENT DOCUMENTS

DE 20 2004 000 941 U1 4/2004
DE 20 2008 009567 U1 9/2008
(Continued)

OTHER PUBLICATIONS

Pilic et al., "Ultrasound Sensory for Monitoring Mechanical Stress on Risk Structures in Surgical Training Systems" Biomedical Engineering, Sep. 7, 2013, XP055173172, ISSN: 0013-5585, DOI: 10.1515/bmt-2013-4427.
(Continued)

*Primary Examiner* — James B Hull
*Assistant Examiner* — Lily M Del Valle
(74) *Attorney, Agent, or Firm* — Heslin Rothenberg Farley & Mesiti P.C.; Stephen P. Scuderi, Esq.

(57) ABSTRACT

A modular surgical training system for training in surgical interventions with real surgical instruments includes a reus-
(Continued)

Figure 1:
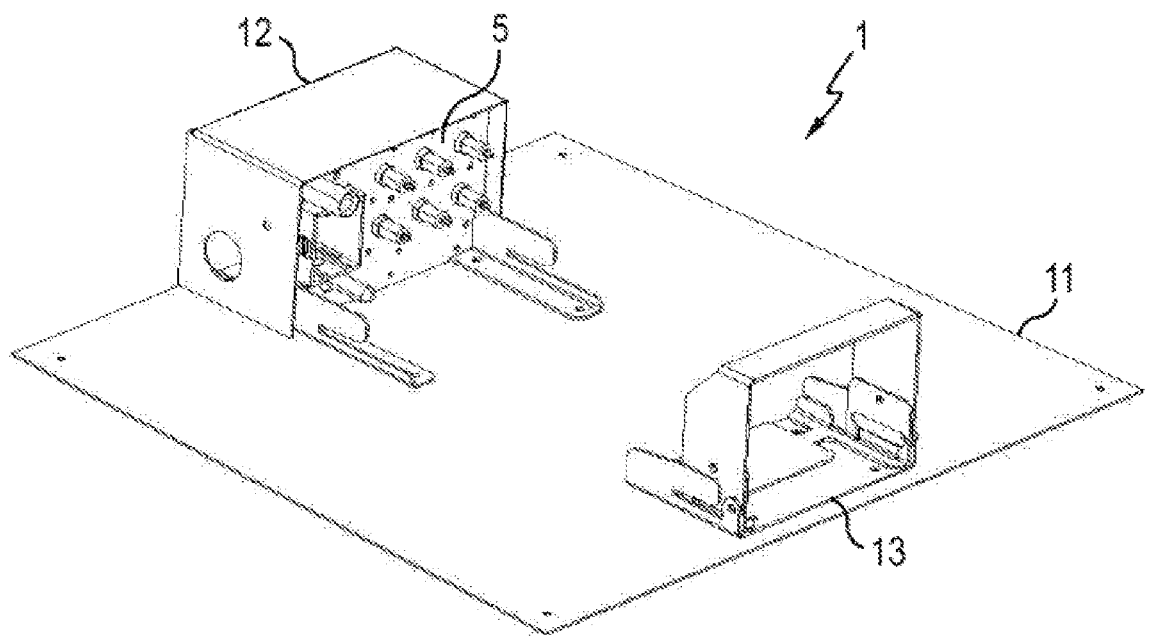

able, energy supplying base module, and a regenerable training module which reproduces or has anatomical structures and can hold at least one consumable medium (for example, bodily fluids). The training module and the base module are detachably connected to one another via a combination interface, and pneumatic and/or mechanical and/or electric energy can be transmitted from the base module to the training module and/or electric signals can be transmitted between base module and training module via the combination interface. The base module and training module include conveying elements detachably connected via the combination interface, and at least one consumable medium can be conveyed into the anatomical structures by the conveying elements.

11 Claims, 5 Drawing Sheets

(58) Field of Classification Search
USPC .......................................... 434/268
See application file for complete search history.

(56) References Cited

U.S. PATENT DOCUMENTS

| | | |
|---|---|---|
| 7,255,680 B1 | 8/2007 | Gharib |
| 7,837,474 B1* | 11/2010 | Nuccio-Youngs ..... G09B 23/34 434/262 |
| 2008/0227073 A1* | 9/2008 | Bardsley ................ G09B 23/30 434/267 |
| 2009/0246747 A1 | 10/2009 | Buckman, Jr. |
| 2011/0076660 A1* | 3/2011 | Morris ................ A61B 8/0875 434/274 |
| 2011/0135547 A1 | 6/2011 | Kobayashi et al. |
| 2013/0078603 A1 | 3/2013 | Yang et al. |

FOREIGN PATENT DOCUMENTS

| | | |
|---|---|---|
| DE | 10 2008 019 026 A1 | 11/2008 |
| EP | 0 624 861 A2 | 11/1994 |
| GB | 2 191 860 A | 12/1997 |
| WO | 94/06109 A1 | 3/1994 |
| WO | 94/09847 A1 | 5/1994 |
| WO | 96/42076 A1 | 12/1996 |
| WO | 02/41285 A2 | 5/2002 |
| WO | 2009/067778 A1 | 6/2009 |

OTHER PUBLICATIONS

Bausch et al., "Design and Development Process of a Next-Generation Training System for Spinal Surgery" Simulation, vol. 89, No. 12, Oct. 29, 2013, pp. 1436-1441, XP055173235, ISSN: 0037-5497, DOI: 10.1177/0037549713496151.
International Search Report for International Application No. PCT/EP2014/074934, dated Mar. 30, 3015.
James I. Fann et al., Improvement in Coronary Anastomosis with Cardiac Surgery Simulation, Journal of Thoracic and Cardiovascular Surgery, 136:6 pp. 1486-1491 (2008).†

* cited by examiner
† cited by third party

Fig. 5
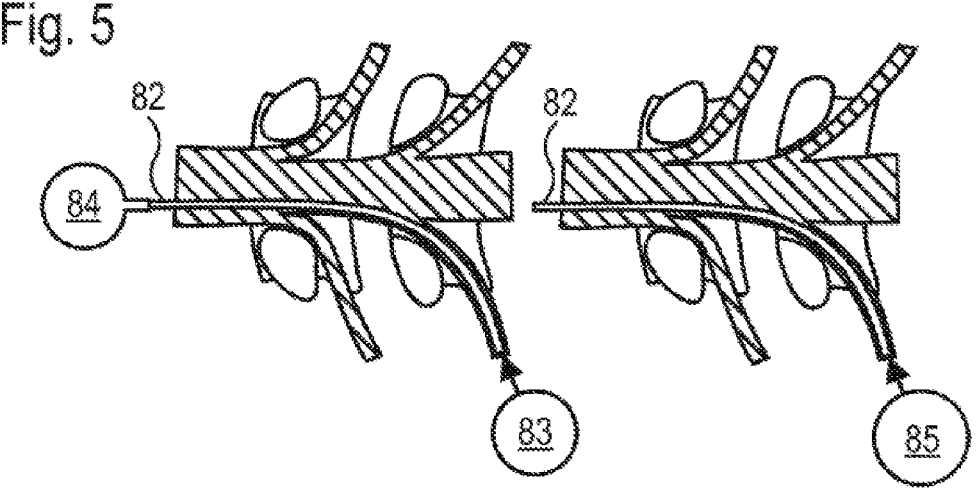
Fig. 6
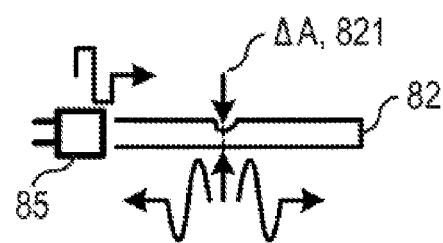
Fig. 7a
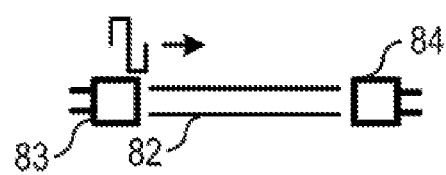
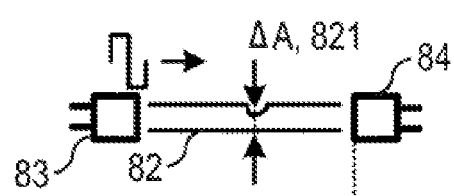
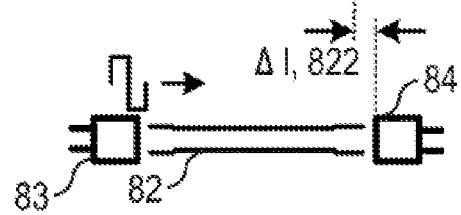
Fig. 7b
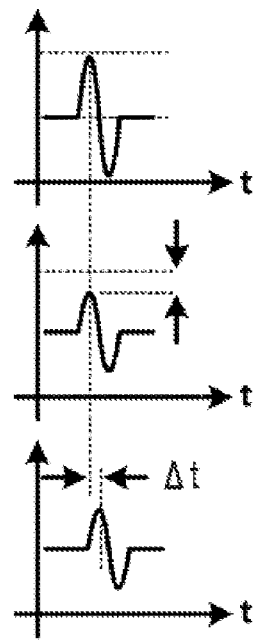

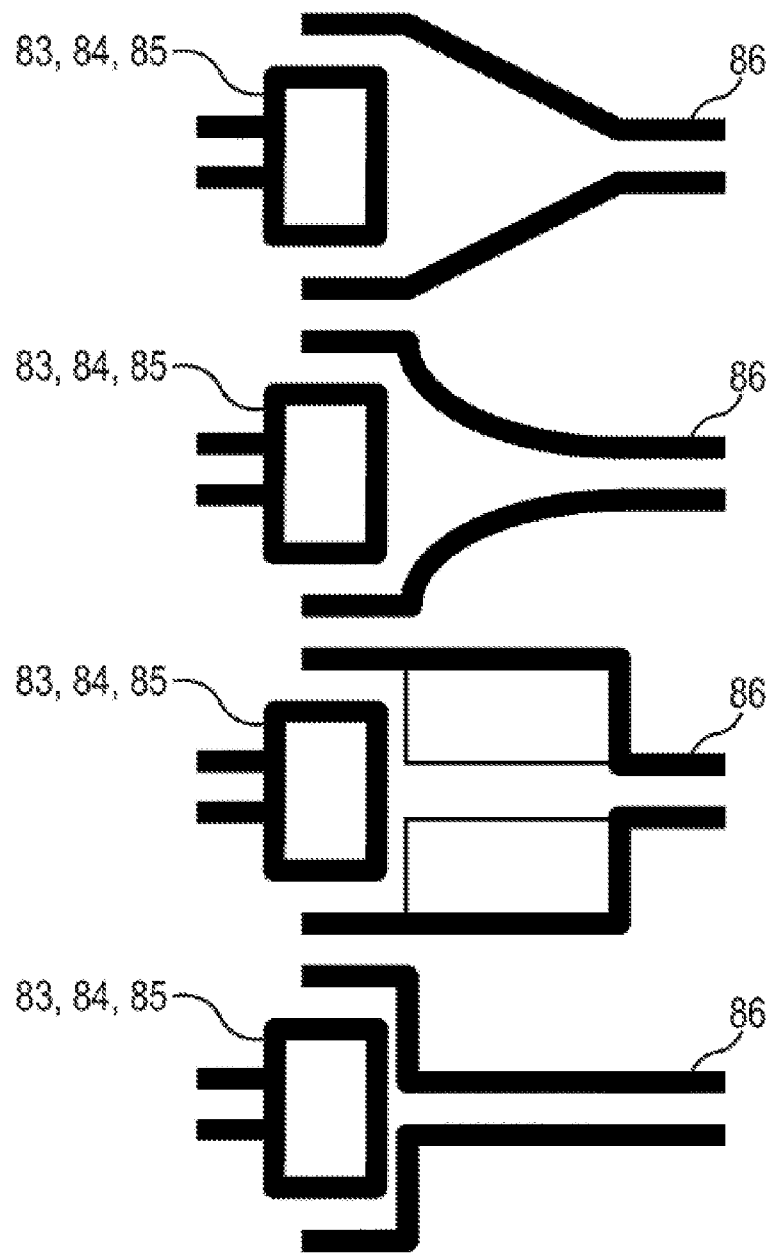

MODULAR SURGICAL TRAINING SYSTEM

CROSS REFERENCE TO RELATED APPLICATIONS

This application is a national stage filing under section 371 of International Application No. PCT/EP2014/074934, filed on Nov. 18, 2014, and published in German on May 28, 2015, as WO 2015/075038 A1 and claims priority of German applications no. 10 2013 112 746.0 and no. 10 2013 112 745.2, both filed on Nov. 19, 2013, the entire disclosure of these applications being hereby incorporated herein by reference.

BACKGROUND ART

The invention relates to a modular surgical training system for training in surgical interventions using real surgical instruments.

Surgical interventions relate to the treatment, i.e., the therapy, of diseases and injuries by direct, manual or instrumental action on the body of the patient, wherein these surgical interventions are adequately referred to as operation or in short OPs. Operations are known both from human medicine and also from veterinary medicine.

For the purpose of practical learning, repeated practice, and for perfecting surgical techniques, a great variety of training systems are known, which differ considerably with regard to their claim to realistic simulation of the actual surgical environment. In addition to entirely computer-based virtual training systems such as those offered, for example, by the company Industrial Virtual Reality Inc., other training systems are known, in which the surgical intervention is practiced on a more or less detailed simulation of an anatomical structure.

These simulated anatomical structures are usually plastic models that can have greatly differing features in terms of their complexity and realistic simulation. In addition to solid bone structures, they contain mainly resilient materials for the representation of human tissue. To achieve the most realistic simulation possible, the focus is primarily on the haptic properties of the anatomical structure, in particular, of the different tissue types such as, for example, bones, vessels or nerves, during the interaction with the surgical instruments held by the practicing operator. During the training, the anatomical structure used is used-up by mechanical treatment such as, for example, cutting, milling or the like, so that it needs to be replaced before the next training session.

Systems for reproducing bodily functions such as, for example, a simulated cardiac circulation system with pulse, blood pressure but also other bodily fluids can be added to these simulated anatomical structures themselves. The simulation of these bodily functions increases the degree of detail of the haptic simulation for the person in training, for example, by simulation of the pressure of the cerebrospinal fluid. Moreover, it is known that bleeding, for example, is simulated by way of filled capsules that are caused to burst, or by way of devices for generating large amounts of blood, as occurs, for example, as a result of severed limbs or arterial injuries.

Furthermore, it is known to reproduce bodily fluids by media such as, for example, fake blood, in order to approximate the color, consistency and external appearance of actual blood as closely as possible. For the generation of a flow or a pressure increase of the corresponding bodily fluids, pumps, primarily peristaltic pumps, and/or valves as well as corresponding lines are used. The peristaltic pumps, also referred to as hose pumps, used here are associated with dead times in the conveyance, due primarily to the principle of operation. The media used for the training have to be refilled or replaced before the next training session. This harbors a number of different disadvantages. Thus, when refilling the media, sufficient venting of the conveyance system must always be ensured; in addition, after a reservoir container for these media has been used repeatedly, deposits and encrustations can occur, which in turn lead to sticking and/or clogging.

This results, therefore, in time consuming and expensive cleaning work.

In a real OP, in the general case, there is stress on sensitive tissues, the at-risk structures, that can cause postoperative complications in human patients. Typical stress types on at-risk structures such as nerves and vessels that occur during OPs are compression (squeezing, compressive stress) and traction (elongation, tensile stress). For the quantitative evaluation of the surgical interventions for training, it is therefore known to use sensors, in particular, pressure sensors and strain gauges. Since the sensors used are located directly on the anatomical structure, they too have to be exchanged before each new training session along with the anatomical structure, which again results in added costs.

There are known surgical training systems that combine individual aspects of the described aspects, such as the reproduction of an anatomical structure, the reproduction of various bodily fluids or the use of a sensor system.

Thus, US 2009/0246747 A1 discloses a training system that reproduces the inside of a human or animal body with all the important organs. The training system includes the reproduction of the cardiac circulation system, wherein the heart is reproduced by a peristaltic pump. The large vessels such as the aorta are reproduced by hoses, wherein the internal pressure of the hoses can be measured by means of pressure sensors, or the volume flow of the medium reproducing the blood can be measured by means of flow meters. Reproduced organs can have channels for the reproduction of the vessels of the organ. Thus, in one design, a vessel rupture of a kidney is reproduced, wherein the medium conveyed by the peristaltic pump exits the vessels in large amounts. If the structure of individual organs has been changed by the training session, for example, by the use of a scalpel, the entire organ is exchanged.

This training system has several disadvantages. After completion of a training session, for example, an operation on a kidney, large parts of the training system can be soiled by exiting fake blood, as a result of which these parts have to be subjected to a thorough time-consuming cleaning. In addition, the reservoir containers of the used-up media have to be refilled again. The used-up anatomical structures, possibly including the corresponding sensors, have to be replaced and connected again to the other organs or vessels. Overall, this involves a very high expenditure in terms of time and personnel, but in the end a very high financial expenditure. In addition, the training system is not available at that time.

Moreover, from WO 2009/067778 A1 a modular training system is known for practicing operations on and/or in the human skull. The training system is provided, for example, for operations for placing an external drain in order to lower the pressure within a ventricle filled with cerebrospinal fluid. For this purpose, the training system comprises a base module and a training module. The training module comprises the reproduced anatomical structure in the form of the ventricle, wherein the ventricle is formed as a latex balloon and filled with water. For the generation of a realistic ventricular internal pressure, the base module comprises a pressure generator, which is formed by a column of liquid. The hydrostatic pressure of the column of liquid acts on a second balloon which is arranged on the base module. If training module and base module are connected to one another, then the second balloon is in an operative connection with a latex balloon. Using a scale that is arranged on the column of liquid, the pressure exerted on the ventricle by the person in training can be quantitatively determined as well.

The disadvantage of this system is that the simulation of bleeding is completely dispensed with. In addition, due to the special design of the base station, the base station is suitable only for simulating operations on and/or in the skull. There is no provision for training on other anatomical structures, as a result of which the field of use is very limited. Furthermore, the pressure generator with the liquid located therein needs to be maintained regularly, since, for example, due to evaporation, liquid can escape, as a result of which the hydrostatic pressure of the column of liquid can vary from one training session to the other. As a result, a new calibration of the pressure generator is needed, which in turn is associated with a time and cost expenditure.

An object of the present invention therefore consists in providing a modular surgical training system which avoids the disadvantages of the prior art and which can be put into operation and returned to a state ready for use by a user within a short period of time without trained personnel and without the user in the process coming into contact with consumable liquids or other liquids, and which is low maintenance, does not require calibration by the user, and is flexible, i.e., suitable for training in a great variety of surgical interventions.

BRIEF SUMMARY OF THE INVENTION

Therefore, a modular surgical training system is proposed, comprising a reusable, energy supplying base module and a regenerable training module which reproduces or has anatomical structures and can hold at least one consumable medium, and which, in particular, is itself not supplied with energy. Here, the training module and the base module are detachably connected to one another via a combination interface. Via the combination interface, pneumatic and/or mechanical and/or electric energy can be transmitted from the base module to the training module and/or electric signals can be transmitted between base module and training module. The base module and the training module comprise conveying means which are detachably connected via the combination interface, wherein, at least one consumable medium can be conveyed into the anatomical structures and/or a pressure can be built up in the anatomical structure by the conveying means.

As a rule, in the present description of the invention, reference is made to artificial simulation materials or artificial anatomical structures, even if they are not explicitly identified as such. However, it is also possible to use true anatomical structures.

An essential advantage of the present invention is the modular design of the training system in the form of a base module and a training module. Materials that are used-up during training, so-called consumable materials such as, for example, anatomical structures or bodily fluids simulated by at least one consumable medium, are associated with the training module. Reusable expensive components such as, for example, pneumatic, electric and/or mechanical actuators, electronic components, or else a torso, for example, for realistic embedding of the anatomical structures, are associated with the base module.

Base module and training module are detachably connected via a combination interface, for example, by a locking mechanism. Therefore, the training system according to the invention is very user friendly and inexpensive. This is achieved in that the base station, together with the above-described expensive components, can normally remain with the user of the training system, while the used-up training module can be removed and under some circumstances returned to the manufacturer for regeneration, i.e., in order to refill the at least one consumable medium and possibly for aeration, and in order to replace the anatomical structures after the mechanical treatment by the training surgeon. Accordingly, a plurality of unused training modules can be kept on reserve, which, after completion of a training session, are connected by the user simply and rapidly via the combination interface to the base station, in order to carry out the next training session. Support from specially trained personnel is not needed; instead, the users themselves can put the training system into operation. Therefore, setup times for the preparation of the next training session are considerably shortened by the modular design according to the invention.

In addition, training modules in each case can also hold different anatomical structures, so that the training system can be used in a very flexible manner and is not limited to a single anatomical area such as the human skull, for example.

An additional advantage according to the invention consists in that the at least one consumable medium is not transferred through the combination interface. As a result, soiling of the training system is avoided, since the at least one consumable medium remains only on or in the training module to be exchanged. No consumable medium conveying hose connections to be disconnected are needed, which would soil the training system additionally. Therefore, time consuming cleaning work can be dispensed with.

Moreover, it is essential for the invention that base module and training module comprise conveying means that can be detachably connected via the combination interface. While active components of the conveying means are arranged in the reusable base module, the passive components are arranged in the training module. Thus, the energy provided by the active components via the combination interface can be transmitted to the passive components, as a result of which the at least one consumable medium can be conveyed into the anatomical structures. According to the invention, consumable media can be conveyed so that they exit from the anatomical structures, for example, in the form of bleeding, or so that they reproduce the internal pressure of an anatomical structure, for example, the cerebrospinal fluid pressure of the dura mater, more precisely the dural sac and the associated nerve roots, without exiting in the process.

By means of the conveying means, at least one simulated bodily fluid can be metered during the training into the site, for example, in the form of bleeding. The metering of the bleeding into the site increases the realism of the training session many times over, since it is only as a result of the bleeding that a typical OP situation is generated. The bleeding thus creates a permanent visual obstruction. The bleeding must be continually suctioned off by the person in training, in order to be able to perform the actual OP steps within the brief period of time of unobstructed view. This generates realistic work courses, since it puts the person in training under time pressure in addition to forcing the person in training to use one hand for holding the suctioning device.

For the disconnection of the active components of the base module from the passive components of the training module via the combination interface, it is possible to provide, in a design according to the invention, that the conveying means in the base station comprise at least one air compressor generating pneumatic energy in the form of pressurized air. The air compressor itself is driven, for example, by electric means, wherein, for this purpose, the base module is supplied with electric energy via an external energy source.

Moreover, it is appropriate for the conveying means in the training module to comprise at least one pressurized volume which holds pressurized air. Via the combination interface, the generated pneumatic energy can be transmitted from the base module to the training module. Moreover, it is possible to provide that the training module comprises at least one consumable media volume which is separated on the media side from the pressurized volume and holds a consumable medium. Here, pressurized volume and consumable media volume interact with one another in such manner that at least one consumable medium can be conveyed into the anatomical structures or an internal pressure is generated in at least one anatomical structure.

According to the invention, as a result of the use of pressurized air as energy carrier, a media-side separation is made possible, i.e., the at least one consumable medium is associated only with the training module and it does not have to be conveyed via the combination interface. In contrast to the use of peristaltic pumps, steady conveyance of the at least one consumable medium can be achieved here, i.e., without the dead times in the conveyance that occur typically with peristaltic pumps. Moreover, another disadvantage of peristaltic pumps is that they are driven by volume flow and thus, in contrast to pressure-driven pumps, the conveyance pressure is not defined, which can, for example, lead to a pressure increase in case of clogging.

In another embodiment of the training system according to the invention, at least two consumable media can be held by the training module, wherein the first consumable medium can be conveyed through at least one exit site of the anatomical structures, and the internal pressure of at least a section of the anatomical structures can be reproduced by means of the second consumable medium. As a result, the realism of the training system is further increased, for example, by forming the first consumable medium as fake blood and the second consumable medium as a medium that simulates the cerebrospinal fluid. Additional consumable media for stimulating other bodily fluids can be provided according to the invention.

Moreover, it is advantageous that the first consumable medium and the second consumable medium each form a separate consumable medium volume, which in each case interacts with a corresponding pressurized volume.

According to the invention, the first consumable medium, which is formed by fake blood, for example, can also be conveyed through more than one exit site of the anatomical structures. Thus, exit sites can be arranged in a plurality of different positions on the anatomical structure, which, however, can, but do not need to, be supplied from the same consumable media volume. Therefore, different bleeding situations can be simulated thereby. An essential advantage of the modular design here again is that, when starting up or regenerating the training system, the user does not have to connect each exit site separately to the consumable media volume. Instead, the anatomical structures, the at least one consumable medium, and the connection thereof to the anatomical structures can already be preassembled in the training module and needs only to be connected to the base station. As a result, failures such as those that occur due to wear, for example, after frequent use, can be prevented. Pressure losses due to leaking caused by wear can be prevented.

In addition, it is advantageous that the base module and the training module comprise control means which are detachably connected via the combination interface and can control at least one volume flow. Here, it is advantageous that the control means can control at least one volume flow of the at least one consumable medium. If, as in another design, several exit sites for a consumable medium are provided on the anatomical structures, then at least one of the volume flows to the exit sites can be controlled by the control means. If several volume flows are controllable, the realism of the training system can be further increased, since different amounts of the at least one consumable medium can exit at different exit sites. Thus it is possible to simulate light to intense arterial bleeding and to practice handling such bleeding.

While active components of the control means are arranged in the reusable base module, the passive components are arranged in the training module. Thus, the energy provided by the active components can be transferred via the combination interface to the passive components, as a result of which the at least one volume flow is controllable.

In one embodiment according to the invention, the control means in the base station comprise at least one constriction hose valve actuator for disconnecting the active components of the base module from the passive components of the training module via the combination interface. The constriction hose valve actuator itself is driven by electric means, for example, wherein, for this purpose, the base module is supplied with electric energy via an external energy source.

Therefore, it is advantageous if the control means in the training module comprises at least one self-blocking constriction hose valve. Via the combination interface, the mechanical energy, which is generated by the constriction hose valve actuator, for example, can be transferred from the base module to the training module, and the self-blocking constriction hose valve is opened. The constriction hose valve can here be arranged so that a connection element, for example, a hose, connecting the consumable media volume to an exit site, can constrict in a continuously controllable manner. Due to the self-blocking of the constriction hose valve, it is possible to prevent the at least one consumable medium from exiting through the exit site on the anatomical structures when the training module is not connected to the base module. In this way, the training module can be transported in such a manner that no additional consumable media exit and soil the training module. In the same way, it is conceivable to use self-opening valves or a combination of self-blocking and self-opening valves.

In order to give the persons in training a feeling for the consequences of their handling steps and in order to alert them, if required, by acoustic, visual and/or tactile means to their mistakes resulting, for example, from excessively high intraoperative stresses, it is advantageous that the base module comprises a sensor module that measures at least one physical variable. However, it is possible here that, for example, measurement transducers are optionally present in the training module. Here, it is advantageous that sensor module and training module comprise measurement means that can be detachably connected via the combination interface. Due to the division of the measurement means into the base module and the training module, the manufacturing and operating costs of the training system can be lowered further. Via the combination interface, the energy and/or electric signals provided by the sensor module for controlling the measurement means can be transmitted from the base module to the training module.

Conversely, acquired physical variables can be transmitted from training module to sensor module by electric signals. The sensor module can in turn transmit the measured physical variables in the form of electric signals to an external evaluation unit, outside of the base module.

Appropriately, the measurement means in the training module comprises at least one ultrasound transmitter and a corresponding ultrasound receiver. For this purpose, for example, ultrasound capsules can be used, which convert electric signals into acoustic pressure waves. In the case of the use of an ultrasound transmitter (transmitter) and a corresponding ultrasound receiver (receiver), the so-called two-capsule measurement principle can be used. Here, an ultrasound capsule as transmitter generates an acoustic pressure pulse in the ultrasound frequency range, which is transmitted along into a measurement medium, passes through said medium, and is converted again at the other end by an ultrasound capsule as receiver into an electric signal. However, according to the invention, a one-capsule measurement principle can also be used. Here, an ultrasound capsule functions as transmitter and receiver. Then, it is no longer the transmitted pulse that is measured, but rather reflections that occur due to the transmission behavior.

Therefore, it is appropriate that the measurement means in the training module comprise at least one air-filled connection means. This connection means can be formed, for example, as a silicone hose, so that it is resiliently deformable.

Moreover, the first end of the connection means can also be connected to the ultrasound transmitter and the second end of the connection means is connected to the ultrasound receiver, so that the two-capsule measurement principle can be used. For the one-capsule measurement principle, one end of the air-filled connection element can be closed in an air-tight manner, wherein the other end of the air-filled connection element can be connected to an ultrasound capsule which functions as transmitter and receiver. Independently of which measurement principle is used, the air-filled connection element forms the measurement medium. The incorporation of air in the measurement medium makes it possible to use low-frequency ultrasound, which reduces the cost for sensors and electronics man times over compared to the high frequency systems thereof.

It is appropriate that the connection means is disposed on or in the anatomical structures, wherein the anatomical structures and the connection means interact with one another, and a deformation of the anatomical structure can be measured by a traction and/or a compression of the connection means. The simultaneous measurement of compression and traction (elongation) by the measurement means using a combination measurement method is essential to the invention. Thus, there is no need to use multiple measurement means and measurement methods. Several connection means can also be provided in order to be able to measure the compression and the traction of areas of the anatomical structures that are spaced apart from one another.

In the integration of a part of the measurement means in the training module, it is advantageous if this part of the measurement means can be prepared, for example, calibrated in such a manner that the user of the training system is relieved of this time consuming work.

In principle, according to the invention, other measurement means, for example, measurement means with sensors, can also be provided for the acquisition of other physical variables such as elongation, pressure, temperature or the like.

According to the invention, the base module can also comprise a controller module that processes an electric signal and that can be connected to a user interface for the operation of the training system. The controller module can be suitable, for example, for controlling the conveying means and/or the control means and/or the measurement means via electric signals, and for receiving electric signals, for example, as measured physical variables of the sensor module. Individual electric signals can be exchanged with a user interface, which can be connected to the controller module by wireless link or by cable. For example, in this manner, direct visual and/or tactile and/or acoustic feedback can be given to the person in training during the training session. Moreover, by means of the user interface, other training parameters such as, for example, the amount and duration of bleeding or other events can be set.

BRIEF DESCRIPTION OF THE DRAWING FIGURES

Figure 3:
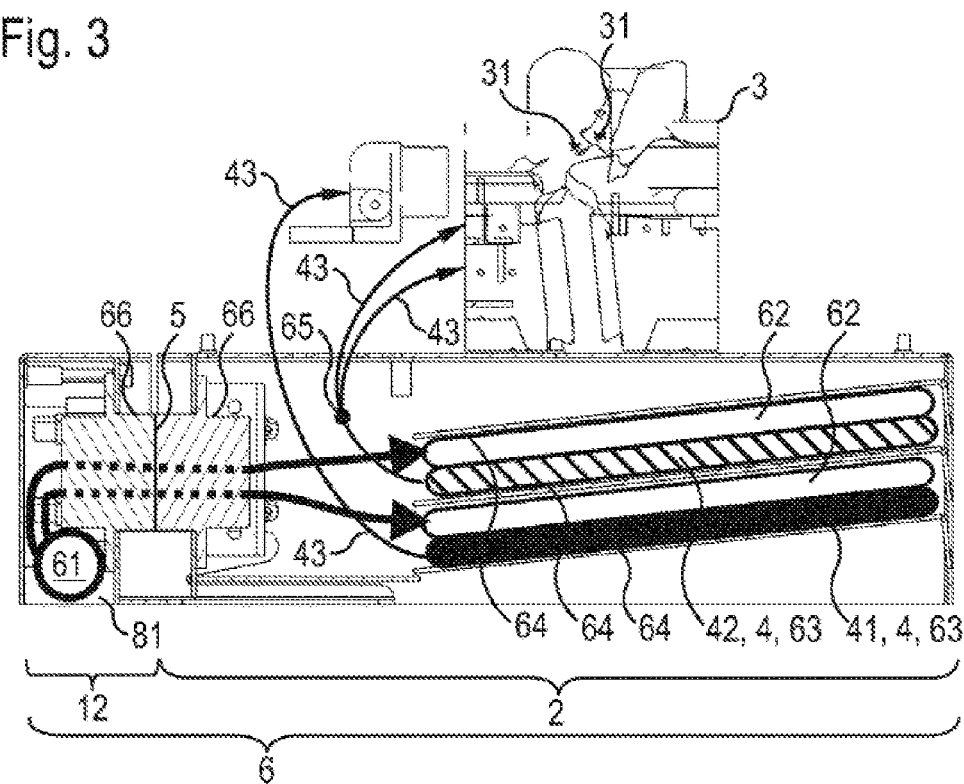
Figure 4:
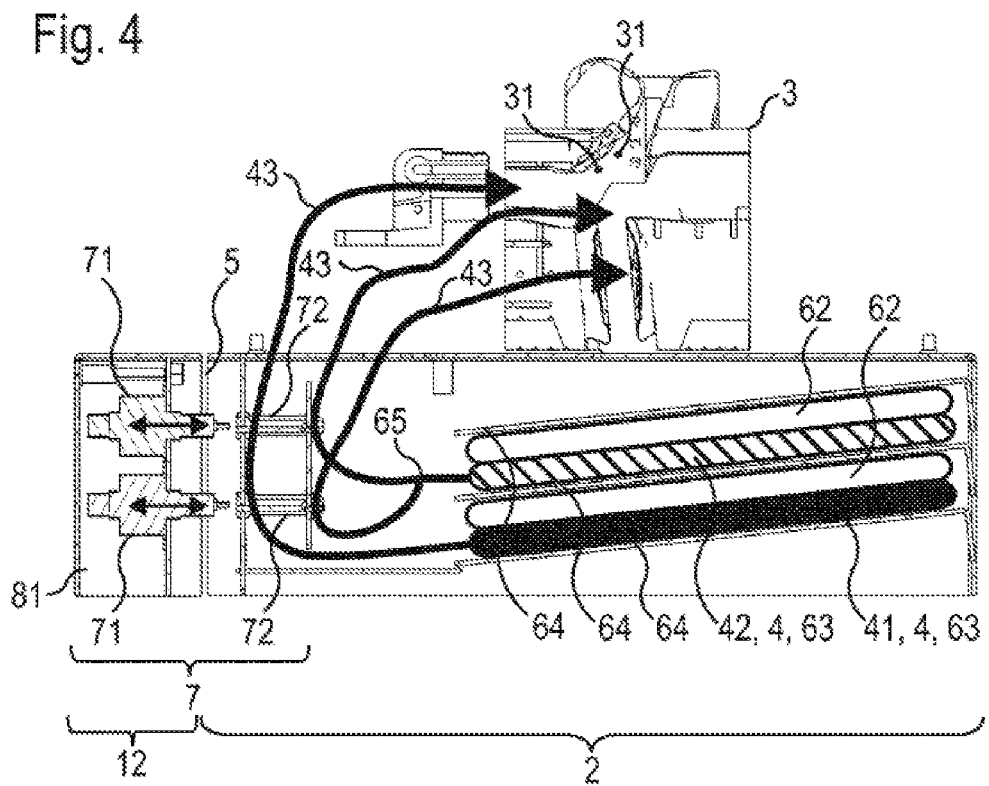
Figure 9:
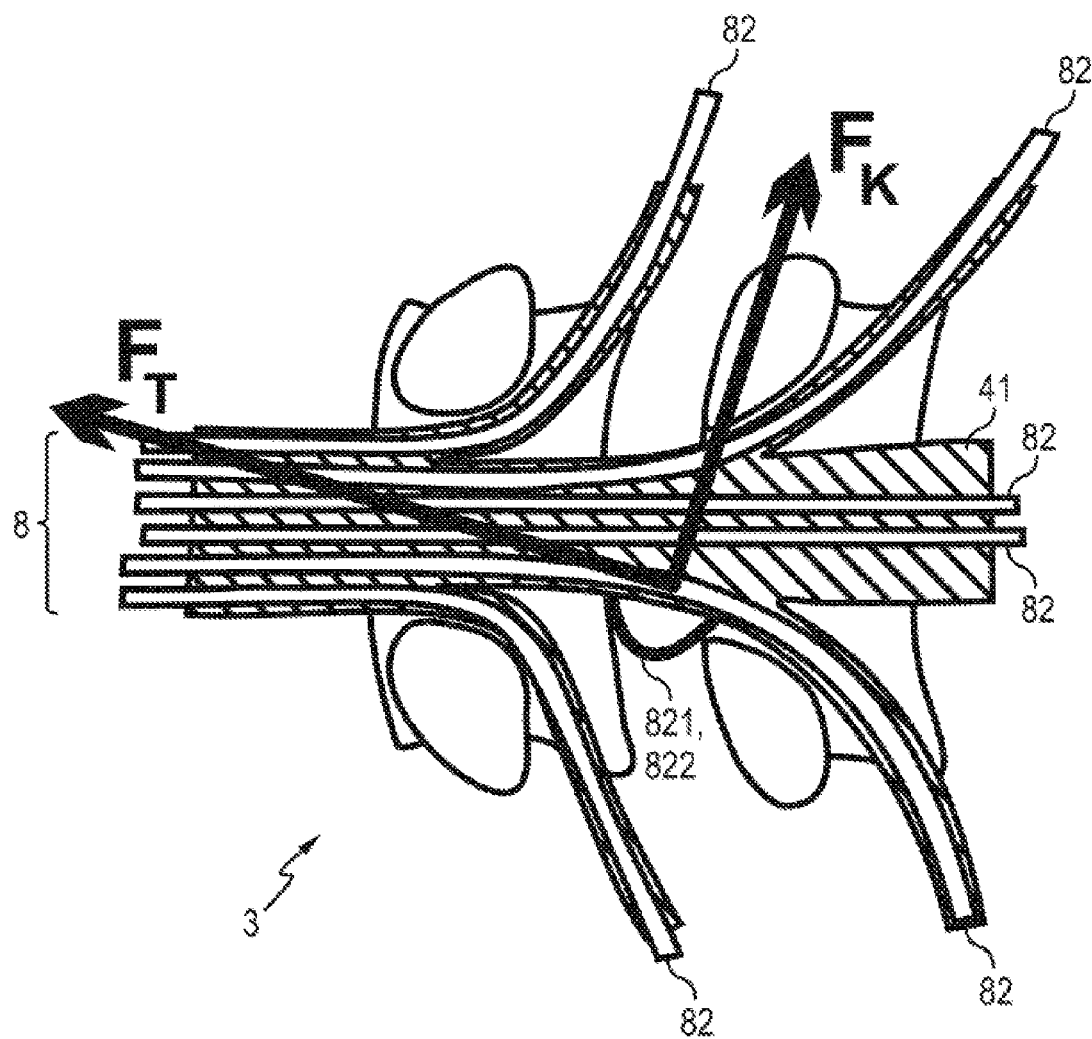

Below, the invention is to be explained in further detail with reference to exemplary embodiments. In the associated drawings FIG. 1 shows an isometric view of a base module of a training system according to the invention, FIG. 2 shows an isometric view of the base module and a training module connected thereto of the same training system according to the invention, FIG. 3 shows a cutaway side view through the base module and the training module with depicted conveying means of the same training system according to the invention, FIG. 4 shows a cutaway side view through the base module and the training module with depicted control means of the same training system according to the invention, FIG. 5 shows an arrangement of measurement means on anatomical structures of the training module, FIG. 6 shows a diagrammatic representation of the one-capsule measurement principle, FIG. 7*a* shows a diagrammatic representation of the two-capsule measurement principle, FIG. 7*b* shows a qualitative representation of a measured signal that changes as a function of the deformation of the measurement means, FIG. 8 shows a diagrammatic representation of different coupling pieces of the measurement means, and FIG. 9 shows an arrangement of the measurement means on the anatomical structures of the training module with labeling of the force action on the measurement means.

DETAILED DESCRIPTION

FIGS. 1 to 9 show a modular surgical training system according to the invention for training in surgical interventions. The modular surgical training system according to the invention is designed in a particularly user-friendly and cost-optimized manner due to its modular construction.

Figure 2:
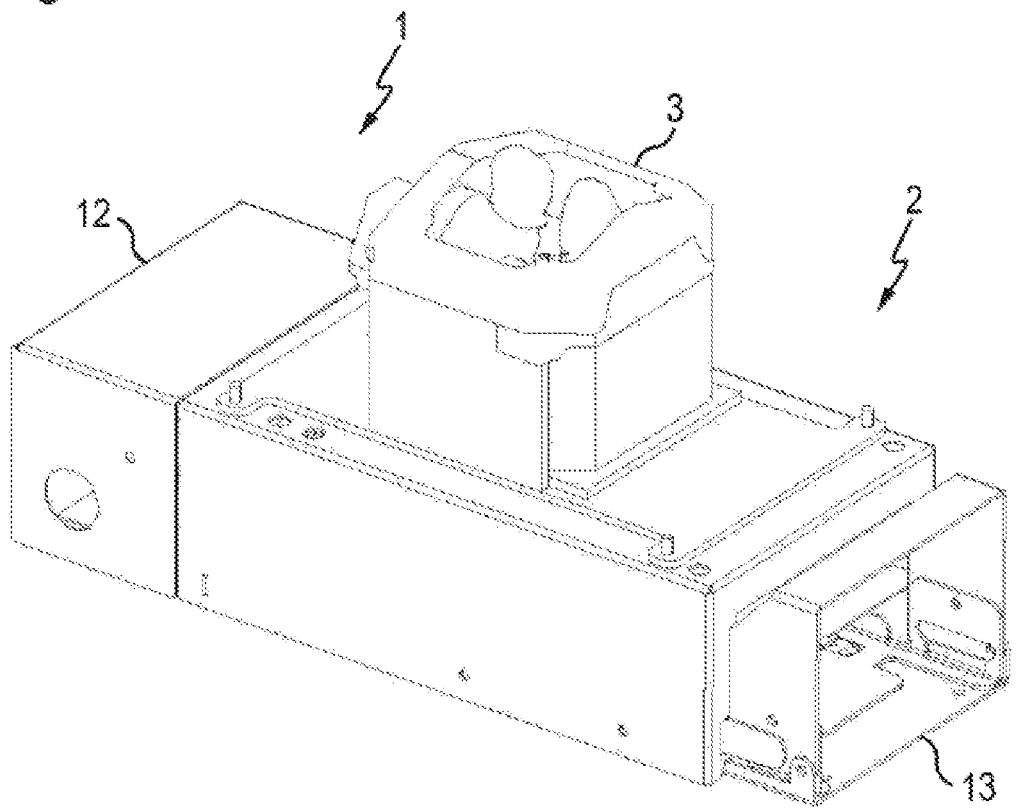

FIG. 1 and FIG. 2 illustrate the advantages of the modular construction. FIG. 1 shows an isometric view of a base module 1 of the training system according to the invention. The base module 1 comprises a base plate 11 which, however, is not shown in FIG. 2. The base plate 11 can be detachably connected to a structure, which is not shown, so that a slipping of the base module 1 is prevented. Arranged on the base plate 11 are both an actuator module 12 on the left side of FIG. 1 and a locking mechanism 13 on the right side of FIG. 1. In the actuator module 12, reusable expensive components of the conveying means 6, of the control means 7 and of the measurement means 8 are arranged. Other components of these conveying means 6, control means 7 and measurement means 8 are arranged in the training module 2. This also includes materials that are used during a training session, so-called consumable materials such as, for example, anatomical structures 3 or bodily fluids simulated by at least one consumable medium 4, which, however, is not shown in FIGS. 1 and 2.

Moreover, the base module 1 can have a torso, which is not shown, arranged on the base module 1 and/or on another structure in such a manner that the anatomical structures 3 are placed on their corresponding site of the human body, in order to simulate in this manner the difficulties of access to the anatomical structures 3. The anatomical structures 3 of this exemplary embodiment represent an area of the human lumbar vertebral column. Since the anatomical structures 3 are arranged exchangeably on the training module 2, other areas of the human body but also the animal body can also be reproduced. As a result, the modular training system is designed in a particularly flexible manner.

A combination interface 5 is provided for the connection of the training module 2 to the base module 1. In this exemplary embodiment, the combination interface 5 comprises connections that are not labeled further, wherein, in each case, connections for the transmission of pneumatic, mechanical and electric energy from the base module 1 to the training module 2 are provided. Furthermore, connections are provided by means of which the electric signals can be exchanged between base module 1 and training module 2. The designation combination interface 5 is chosen here, since different energies or energy carriers can be transmitted via a common, combined interface (combination interface 5). Via this interface, media such as fluids, for example, can also be transferred. The training module 2 comprises connections corresponding to the base module 1, so that the base module 1 and training module 2 can be detachably connected to one another via the combination interface 5. To ensure the connection, a locking mechanism 13 is provided, which is formed as a clamping lever.

FIG. 3 to FIG. 5 diagrammatically depict the arrangement of the conveying means 6, control means 7 and measurement means 8, not shown or depicted only partially in FIGS. 1 and 2, on base module 1 and training module 2. Due to the modular construction of the training system, both base module 1 and also training module 2 each have components of the conveying means 6, control means 7 and measurement means 8.

First, the formation of the conveying means 6 represented diagrammatically in FIG. 3 will be described. In principle, the conveying means 6 are provided in order to convey at least one consumable medium 4 into the anatomical structures 3. In this exemplary embodiment, which, as explained above, reproduces an area of the human lumbar vertebral column, it is provided to convey two consumable media 4 into anatomical structures 3. The first consumable medium 4 here simulates blood 42. The blood 42 is conveyed into the anatomical structures 3 in such a manner that it exits from the anatomical structures 3 through exit sites 31. The second consumable medium 4 simulates cerebrospinal fluid 41. The cerebrospinal fluid 41 is conveyed into the anatomical structures 3 in such a manner that it simulates the internal pressure of the dura mater or of the individual nerve roots, which are reproduced by the anatomical structures 3. In this regard, this exemplary embodiment of the modular training system differs from the prior art, since two different consumable media 4 are used.

In the cutaway view according to FIG. 3, the actuator module 12 of the base module 1 is depicted on the left side. An air compressor 61 is arranged in the actuator module 12, wherein the air compressor 61 is supplied with electric energy via an external voltage source, which is not shown. For this purpose, the base module 1 comprises a connection, not shown, which can be connected to this voltage source. The electric energy of this external voltage source is also used for supplying the control means 7, the measurement means 8, but also other means that are not shown. The air compressor 61 generates pneumatic energy in the form of air pressure.

In each case, the air compressor 61 is connected via a pair of hose connections that are not identified further as well as via plug connectors 66 on the combination interface 5, to a pressurized volume 62 arranged in the training module 2; here, the arrows in FIG. 3 indicate the connection diagrammatically. A corresponding consumable medium volume 63 is associated with each pressurized volume 62. Blood 42 is arranged in one consumable medium volume 63, and cerebrospinal fluid 41 is arranged in the other consumable medium volume 63. Pressurized volume 62 and consumable media volume 63 are formed as pressure pouches and are produced from plastic, for example. In each case, a corresponding pressurized volume 62 and consumable media volume 63 pair is arranged between a pair of plates 64. Wherein pairs of these plates 64 can also comprise common plates 64. Due to the limited space between the plates 64, a volume increase of the pressurized volume 62, which is caused by the elevated air pressure, is transmitted to the consumable media volume 63, as a result of which the latter is compressed. However, since the consumable medium 4 is essentially incompressible, it gives way to the volume increase of the pressurized volume 62. The blood 42 can be conveyed to the exit sites 31 via corresponding hose connections, which are not depicted but instead merely indicated by arrows. All the exit sites 31 can here be supplied with blood 42 from a consumable media volume 63. For this purpose, a distributor 65 is provided, which divides the blood 42 into individual volume flows 43. Via corresponding hose connections that are not identified further, the cerebrospinal fluid 41 can be conveyed into the dura mater and the nerve roots simulated by the anatomical structures 3. However, in the process, the cerebrospinal fluid 41 does not exit the anatomical structures 3, but rather simulates the internal pressure of the anatomical structures 3. Fluid will exit, however, if the anatomical structure is injured, for example, if a perforation of the dura mater is produced.

An essential advantage of the present invention consists in that the consumable media 4 are not transferred via the combination interface 5. The used-up consumable media 4 and the used-up anatomical structures 3 remain exclusively in the training module 2, which, after the training session, is separated from the base module 1 after opening the locking mechanism 13. The training module 2 can then be returned, for example, by mail, to the manufacturer, who subjects it to regeneration in order to replace the anatomical structures 3 and also the consumable media 4. As a result, the base module 1 is protected against soiling. Immediately after a completed training session, the training module 2 can be removed and replaced with a new, unused training module 2. No training interruptions result due to a time-consuming regeneration that affects the entire training system, since the base station 1 can be reconnected immediately to the new, unused training module 2 to continue the training.

For the metering itself of the conveyed consumable media 4, control means 7 are provided, which are represented in the cutaway side view of FIG. 4. In the actuator module 12, two hose valve constriction actuators 71 are arranged for this purpose, wherein the hose valve constriction actuators 71 are supplied with electric energy via the above-mentioned external voltage source, which is not shown. In another design of the invention, more than two hose valve constriction actuators 71 can be arranged in the actuator module 12. In each case, it is advantageous to associate a hose valve constriction actuator 71 with each volume flow 43 formed by a consumable medium 4.

By means of mechanical connections that are not identified further, mechanical energy can be transmitted in the form of a changeable operating displacement of the hose valve constriction actuators 71 via the combination interface 5. Here it is also possible to control the flow not only via the operating displacements but also via a pulse width-modulated pulse operation (between the on/off states). The actual setting of the respective volume flows 43 to the exit sites 31 occurs in the training module 2 by means of constriction hose valves 72 arranged there. The constriction hose valves 72 are designed to be self-blocking and/or self-opening and can be opened by a pressure force applied to the hose valve constriction valve 72. The pressure force is provided here by the hose valve constriction actuator 71 and transmitted in the form of mechanical energy via the combination interface site 5. In the present exemplary embodiment, two constriction hose valves 72 are provided, so that the volume flows 43 of the two exit sites 31 can be set separately.

In principle, the conveyance of the consumable media 4 can be decoupled from the metering of the consumable media 4 due to the arrangement of conveying means 6 and control means 7. As a result, cross influencing of the volume flows 43 of different exit sites 31 can be reduced by changing the position of the constriction hose valves 72. Since the constriction hose valves 72 are arranged in the training module 2, the expensive adjustment thereof by the user can moreover be dispensed with, and the adjustment can be carried out instead by the manufacturer when the training module 2 is regenerated. This also applies to the aeration of the conveying means 6, which can already be carried out during the regeneration. Due to the arrangement of the consumable media 4 in the training module 2, it is possible to dispense with a consumable media tank according to the prior art. As a result, the risk of clogging or sticking of the conveying means 6 with consumable media 4 can be nearly ruled out, since the consumable media conveying components of the conveying means 6 are arranged in the training module 2, and the latter is regenerated. In other words, the user does not have to deal with the refilling of the consumable media 4. Here, it is also advantageous that the user of the training system does not have to carry out a time consuming startup of the training system, since the conveying means 6 are already connected to the exit sites 31.

In order to give the persons in training a feeling for the consequences of their handling steps and in order to alert them as required by acoustic, visual and/or tactile means to their mistakes resulting, for example, from excessively high intraoperative stresses, it is advantageous that the base module 1 comprises at least one sensor module 81 that measures at least one physical variable. The sensor module 81 is the part of the measurement means 8 that is arranged in the base station 1, wherein the sensor module 81 can transmit electric energy via the combination interface 5 to the part of the measurement means 8 arranged in the training module 2. For the transmission of, for example, control signals or measurement signals, the measurement means 8 can exchange electric signals via the combination interface 5.

As already explained, typical stress types on at-risk structures, such as nerves and vessels, that occur during the OP are compression 821 (squeezing, compressive stress) and traction 822 (elongation, tensile stress). Resilient tissues react highly variably to stresses, since the deformation as a consequence of an applied force depends on volume, material properties, external shape and embedding.

Compression 821 and traction 822 can occur anywhere on the anatomical structures 3. In another exemplary embodiment, for the local measurement of these stresses, it is possible to use one-dimensional or multi-dimensional strain gauges or also directly one-dimensional or multi-dimensional load cells. However, this embodiment is very expensive in terms of cost and material, since a plurality of individual strain gauges or load cells have to be applied on or in the anatomical structures 3.

On the other hand, ultrasound in the pulse method with the use of a measurement head for transmitting and receiving is widely employed in the field of medical imaging methods and therapies, but also, for example, in the field of materials testing. The basis is the measurement of reflected ultrasound waves and the evaluation of the transit time of the signals, in order to show inner organs or defects in components, for example. The disadvantage is the high ultrasound frequency that is needed for a sufficiently high resolution and precision. Also, these systems need continual adjustment by specialized personnel only.

The measurement means 8 of this exemplary embodiment comprise the sensor module 81 in the base module 1 as well as an ultrasound transmitter 83, an ultrasound receiver 84, and an air-filled connection means 82 which at the same time forms the measurement medium 82, in the training module 2. In another exemplary embodiment, no medium 82 is provided. However, with the use of the measurement medium 82, integration of the measurement means 8 in the anatomical structures 3 can be facilitated.

Interaction of the anatomical structures 3, which are represented at least partially in FIG. 5 and which comprise a dura mater with nerve roots and also vertebral bodies, with the measurement medium 82, for example, by the interaction of the person in training with the anatomical structures 3, causes a change in the geometric properties of the measurement medium 82. For the acquisition of this change, ultrasound capsules, which convert electric signals into acoustic ultrasound waves, are placed at open ends of the air-filled measurement medium 82. FIG. 5 shows two possible configurations for the formation of the measurement means 8. For this purpose, the measurement medium 82 is integrated in portions of the dura mater and in a nerve root of a vertebra, i.e., in the interior of the anatomical structure 3 filled with cerebrospinal fluid 41.

In the two-capsule measurement principle, which is depicted in the left area of FIG. 5, an ultrasound capsule as ultrasound transmitter 83 generates an ultrasound wave in the ultrasound frequency range, which is transmitted along into the measurement medium 82, travels through the measurement medium 82, and is converted into an electric signal again at the other end by an ultrasound capsule as ultrasound receiver 84.

In the one-capsule principle, which is depicted in the right area of FIG. 5, an ultrasound capsule functions as ultrasound transceiver unit 85, wherein it is not the transmitted pulse that is measured, but rather the reflections thereof that occur due to the transmission behavior.

Ultrasound capsules, in general, have a cross section that is greater than that of the measurement medium 82. This is the case particularly if the measurement medium 82 is dimensioned very small to be arranged in small anatomical structures 3. Thus, a coupling has to be provided, in order to arrange the ultrasound capsules 83, 84, 85 at the ends of the measurement medium 82, and in order to couple the ultrasound waves from the large cross section of the ultrasound capsules 83, 84, 85 to the small cross section of the measurement medium 82, or in order to decouple them again from the small cross section to the large cross section. Accordingly, suitable coupling media 86 are used. The special feature of these coupling media 86 is that they have a predetermined cross section profile as extension of the measurement medium 82.

Different formations of the coupling media are represented as examples one below the other, in FIG. 8, wherein these coupling media in each case have different advantages and disadvantages. Thus, the linear funnel represented at the very top in FIG. 8 is suitable for transmitting a very large amount of energy from the ultrasound transmitter 83 or from the ultrasound transceiver unit 85 to the measurement medium 82. The same applies in the reverse direction, from measurement medium 82 to the ultrasound receiver 84 or to the ultrasound transceiver unit 85. The exponential funnel depicted second from the top in FIG. 8 has a hyperbolic transition, which adapts the cross section of the measurement medium 82 to the ultrasound capsules in such a manner that no measurable reflections occur on the coupling medium 86. Third from the top in FIG. 8, a coupling medium 86 with a sound damper is represented, wherein the cross section transition is formed by an indentation. The sound damper damps the entering ultrasound waves and it leaves only a very small passage free, adapted to the inner diameter of the measurement medium 82, for the transition into or out of the measurement medium 82. As a result, a very smooth ultrasound wave is transmitted into the measurement medium 82. Here, it is advantageous that the electric signal to be acquired has a very satisfactory signal shape, i.e., a signal shape without much interference. Fourth from the top in FIG. 8, a wall funnel is represented, which is formed geometrically like the funnel with sound damper, but which lacks a sound damper.

For processing the electric signals from and to the ultrasound capsules 83, 84, 85, the sensor module 81 comprises analog and digital switching parts, which are not shown. Via a digital-analog converter, signal shapes for the transmission are produced, amplified and conveyed to the ultrasound transmitter 83 or to the ultrasound transceiver unit 85. Via an analog-digital converter, the received signal of the ultrasound receiver 84 or of the ultrasound transceiver unit 85, after filtering and amplification, is converted into digital values in the form of electric signals. The processing of these digitized values by a processor, which is not shown, is the basis of the calculation of the original stresses due to applied force. For this purpose, the processor, which is not shown, can comprise commands of adaptable software that can be stored separately in the sensor module 81.

The following is a description in connection with FIG. 6 and FIG. 7a and FIG. 7b of how conclusions regarding the application of force can be drawn from an action on the anatomical structures 3.

In the case of a propagation of an ultrasound wave in the measurement medium 82, a change in the acoustic impedances occurs at each change in cross section ΔA of the measurement medium 82, resulting in reflections. When the ultrasound wave passes through such a site with a change in cross section ΔA, this leads to a change in acoustic impedance and to the division of the ultrasound wave into a reflected part and a transmitted part, see the ultrasound waves depicted diagrammatically in FIG. 6. The reflected part is reflected to the ultrasound transmitter 83 or to the ultrasound transceiver unit 85. The transmitted part maintains the direction of the original ultrasound wave. The division of the energy of the original ultrasound wave is dependent on the value of the change in cross section ΔA. Without a change in cross section ΔA no reflection occurs; with increasing change in cross section ΔA, the energy portion of the reflected ultrasound wave increases, and the transmitted ultrasound wave is damped.

As explained, two measurement principles are distinguished. In the two-capsule measurement principle, the transmitted part of the ultrasound wave in the original signal is detected and evaluated. To illustrate the two-capsule measurement principle, FIG. 7a represents from top to bottom the undisturbed starting state of the measurement medium 82, the measurement medium 82 with a change in cross section ΔA, and the measurement medium 82 with a change in length Δ1. In FIG. 7b, the corresponding electric signals converted by the ultrasound receiver 84 are depicted qualitatively, for example, as electric voltage versus time t.

The ultrasound transmitter 83 transmits ultrasound pulses of finite length at fixed periodic intervals relative to one another. If the measurement medium 82 is not stressed, the electric signal of the ultrasound receiver 84 corresponds to the undisturbed transmitted ultrasound wave. The latter is adapted in the non-stressed state to the input signal range of the analog-digital converter.

In the case of orthogonal stressing, a decrease in the energy of the transmitted ultrasound pulse due to the change in cross section ΔA occurs, and thus a decrease in the amplitude of the electric signal in comparison to the original signal without stress occurs. Then, the difference between the energies is a measure of the change in cross section ΔA, so that a damping parameter D can be defined:

$$D = \frac{E_1}{E_0}$$

which is dependent on the measure of the change in cross section ΔA. The transmitted ultrasound pulse has energy $E_1$, and the original ultrasound pulse without stress has energy $E_0$.

If the measurement medium 82 is stressed in longitudinal direction, the change in length Δ1 causes a temporal offset Δt of the transmitted ultrasound pulse in the electric signal to be evaluated in comparison to the original electric signal without stress. By means of this temporal offset Δt, the change in length Δ1 can be calculated:

$$\Delta l = c_L \Delta t$$

wherein $c_L$ is the speed of the ultrasound wave in the measurement medium 82, and is calculated by means of the temperature in the interior of the measurement medium 82.

The original compressive force $F_K$ can be calculated by calibration as a function of the change in length Δ1 and the damping D. The same applies to the original, length-changing force $F_T$:

$F_K=f_1(\Delta l,D)$, $F_T=f_2(\Delta l,D)$ wherein the compressive force $F_K$ is dependent mainly on the damping D, and the length-changing force $F_T$ is dependent mainly on the change in length $\Delta l$.

As explained in the case of the one-capsule measurement principle, the reflected part of the wave is detected and evaluated in the output signal. The ultrasound wave introduced by the ultrasound transceiver unit 85 is reflected completely at the closed-off end and it moves back to the ultrasound transceiver unit 85, which, as receiver, now converts the ultrasound wave again into an electric signal which is the object of the evaluation.

If there is no load on the measurement medium 82, the signal is identical to the one depicted at the top of FIG. 7a and FIG. 7b. In contrast to the two-capsule principle, the ultrasound wave travels twice the distance, so that the absolute transit time of the ultrasound wave corresponds to twice the length of the measurement medium 82.

The force applied in the longitudinal direction of the measurement medium 82 according to FIG. 7a (bottom) leads to an elongation of the measurement medium 82, which also leads to a change in transit time, a temporal offset $\Delta t$, of the ultrasound wave. The calculations remain the same.

The orthogonal force application according to FIG. 7a (center) leads to a reflection at the site of the change in cross section $\Delta A$. In contrast to the two-capsule principle, the amplitude of the electric signal of the ultrasound transceiver unit 85 increases the stronger the compressive force application is. Analogously to the two-capsule principle, the damping parameter D can be calculated as:

$$D = \frac{E_0 - E_1}{E_0}$$

which is dependent on the change in cross section $\Delta A$. The reflected ultrasound wave has energy $E_1$, and the original ultrasound wave without stress has energy $E_0$. The advantage of the one-capsule measurement principle is that the site of the force application can be determined via the transit time of the ultrasound wave.

By means of the damping parameter D and the change in length $\Delta l$, the original forces can be determined in the same way as already described above.

In this way, in an additional exemplary embodiment, it is also possible that a plurality of connection means, measurement media 82, are arranged in the anatomical structures 3. FIG. 9 shows such an exemplary embodiment based on the first exemplary embodiment of FIG. 1 to FIG. 5. The measurement media 82 are arranged, according to FIG. 9, so that in each case a measurement medium 82 is arranged in a nerve root, wherein, in each case, two nerve roots are associated with a vertebral body. The measurement media 82 in turn are arranged within the cerebrospinal fluid 41, wherein this cerebrospinal fluid 41 in turn can have a pressure which is generated by the corresponding conveying means 6.

Also depicted in FIG. 9 are the compressive force $F_K$ to be determined via the measurement means 8 and the length-changing force $F_T$, for example, as reaction forces of compression 821 or traction 822. A particular advantage of measurement means 8 formed in this manner is that the acting forces $F_K$ and $F_T$ can be determined in any position of the force application on the measurement medium 82. In other words, a change in cross section $\Delta A$ and/or a change in length $\Delta l$ can be determined integrally over the entire measurement medium 82. Moreover, it is advantageous in measurement means 8 formed in this manner that the acting forces $F_K$ and $F_T$ can be determined with the same means, i.e., an ultrasound transmitter 83 with a corresponding ultrasound receiver 84 or an ultrasound transceiver unit 85.

The training simulator is operated via a user interface, which is not shown, which communicates by wireless link or by cable with a controller module, which is not shown, wherein the controller module is arranged on the base module 1, for example, in the actuator module 12. The user interface can be formed, for example, as a portable terminal, in the form of a laptop, tablet PC, smartphone or the like.

The user interface is suitable for receiving electric signals provided by the controller module from the conveying means 6, the control means 7 and the measurement means 8, and for transmitting electric signals to the conveying means 6, the control means 7 and the measurement means 8 via the controller module. Thus, for example, the pressure level of the pressurized air provided by the air compressor 61 can be set. Moreover, the volume flows 43 of blood 42 to the respective exit sites 31 can be set. In addition, the current pressure of the compressed air and the current volume flows 43 can be depicted both qualitatively and quantitatively. Applications of force by the person in training to the anatomical structures 3, which can be determined by the measurement means 8, can also be represented visually as well as acoustically. Thus, feedback on the mechanical stress resulting from their work on the at-risk anatomical structures can be issued instantaneously to the person in training.

MODULAR SURGICAL TRAINING SYSTEM

List of Reference Numerals

1 Base module
11 Base plate
12 Actuator module
13 Locking mechanism
2 Training module
3 Anatomic structures
31 Exit sites
4 Consumable media
41 Cerebrospinal fluid, simulated
42 Blood, simulated
43 Volume flow
5 Combination interface
6 Conveying means
61 Air compressor
62 Pressurized volume
63 Consumable media volume
64 Plate
65 Distributor
66 Plug connector
7 Control means
71 Constriction hose valve actuator
72 Constriction hose valve
8 Measurement means
81 Sensor module
82 Connection means, measurement medium
821 Compression
822 Traction
83 Ultrasound transmitter
84 Ultrasound receiver
85 Ultrasound transceiver unit
86 Coupling medium
$\Delta A$ Change in cross section $c_L$ Speed of the ultrasound wave
Δl Change in length
Δt Temporal offset
D Damping parameter
$E_0$ Energy of the original pulse
$E_1$ Energy of the transmitted pulse
$F_K$ Compressing force
$F_L$ Length changing force
t Time

The invention claimed is:

1. A modular surgical training system for training surgical interventions, comprising
   a regenerable training module reproducing or having anatomical structures and capable of holding at least one consumable medium,
   a reusable base module, supplying energy to the training module, wherein
      the training module and the base module are detachably connected to one another via a combination interface, and
   pneumatic and/or mechanical and/or electric energy can be transmitted from the base module to the training module and/or electric signals can be transmitted between the base module and the training module via the combination interface, wherein
   the base module and the training module comprise conveying means detachably connected via the combination interface, and at least one consumable medium can be conveyed into the anatomical structures by the conveying means,
   wherein the base module comprises a sensor module that measures at least one physical variable,
   wherein the sensor module and the training module comprise measurement means detachably connected via the combination interface,
   wherein the measurement means in the training module comprise at least one ultrasound transmitter and at least one corresponding ultrasound receiver, and
   wherein the measurement means in the training module comprise at least one air-filled connection means.

2. The modular surgical training system according to claim 1, wherein at least two consumable media can be held by the training module, wherein a first consumable medium can be conveyed through at least one exit site of the anatomical structure, and via the second consumable media, an internal pressure of at least one section of the anatomical structures can be reproduced.

3. The modular surgical training system according to claim 1, wherein the base module and the training module comprise control means detachably connected via the combination interface and can control at least one volume flow.

4. The modular surgical training system according to claim 3, wherein at least one volume flow of the at least one consumable medium can be controlled by the control means.

5. The modular surgical training system according to claim 3, wherein the control means in the base module comprise at least one constriction hose valve actuator.

6. The modular surgical training system according to claim 3, wherein the control means in the training module comprise at least one self-blocking and/or self-opening constriction hose valve.

7. The modular surgical training system according to claim 1, wherein a first end of the connection means is connected to the ultrasound transmitter and a second end of the connection means is connected to the ultrasound receiver.

8. The modular surgical training system according to claim 1, wherein the connection means is arranged on or in the anatomical structures, wherein the anatomical structures and the connection means interact with one another, and a deformation of the anatomical structure can be measured by a traction and/or a compression of the connection means.

9. The modular surgical training system according to claim 1, wherein the base module comprises a controller module which processes electric signals and can be connected to a user interface for the operation of the training system.

10. The modular surgical training system according to claim 1, wherein the conveying means in the base module comprise at least one air compressor generating pneumatic energy in the form of pressurized air.

11. The modular surgical training system according to claim 1, wherein the conveying means in the training module comprise at least one pressurized volume holding pressurized air and at least one consumable media volume separated on a media side from the at least one pressurized volume and holding a consumable medium, wherein the at least one pressurized volume and the consumable media volume interact with one another, so that at least one consumable medium can be conveyed into the anatomical structures and/or a pressure can be generated in the anatomical structure.

* * * * *